United States Patent [19]

Kimura et al.

[11] 4,363,823
[45] Dec. 14, 1982

[54] METHOD OF FRYING FOODS IN THE PRESENCE OF A SPICE ANTIOXIDANT

[75] Inventors: Yukichi Kimura, Narashino; Takeshi Kanamori, Chiba, both of Japan

[73] Assignee: Lion Corporation, Tokyo, Japan

[21] Appl. No.: 207,932

[22] Filed: Nov. 18, 1980

[30] Foreign Application Priority Data

Nov. 24, 1979 [JP] Japan .............................. 54-152240

[51] Int. Cl.³ .............................................. C11B 5/00
[52] U.S. Cl. ................................... 426/542; 252/398; 260/398.5; 426/417; 426/544; 426/429; 426/545; 426/431; 426/546; 426/547; 426/438; 426/613; 426/655
[58] Field of Search ................... 426/253, 321, 330.6, 426/541, 542, 654, 655, 417, 424, 429, 430, 431, 438, 481, 489, 492, 495, 613, 651, 544, 546, 547, 545; 252/398, 399, 401, 400 A, 403, 405, 407; 260/236.6, 398.5, 412.2, 412.4, 705, 708

[56] References Cited

U.S. PATENT DOCUMENTS

| | | | |
|---|---|---|---|
| 2,223,244 | 11/1940 | Bohm et al. | 426/542 X |
| 2,523,127 | 9/1950 | Lundberg | 426/544 |
| 2,571,948 | 10/1951 | Sair et al. | 426/655 X |
| 2,950,975 | 8/1960 | Hervey | 426/542 |
| 3,950,266 | 4/1976 | Chang et al. | 426/542 X |
| 4,012,531 | 3/1971 | Viani | 426/542 X |
| 4,110,483 | 8/1978 | Bishov | 426/655 X |

FOREIGN PATENT DOCUMENTS

| | | | |
|---|---|---|---|
| 49-126578 | 4/1974 | Japan | 426/544 |
| 55-18435 | 2/1980 | Japan | 426/542 |
| 2033768 | 5/1980 | United Kingdom | 426/542 |

OTHER PUBLICATIONS

Osol, *The Dispensatory of the USA*, 1947, pp. 757-761, 765, 766 and 771.
Chipault et al., "The Antioxidant Properties of National Spices", *Food Research*, vol. 17, 1952, pp. 46-55, 426-542.
Kurth et al., "Dihydrogenacetin as a Antioxidant", *Journal of America Oil Chemistry Society*, vol. 28 (10), pp. 433-436, 10-1951.
Hawley *The Condensed Chemical Dictionary*, 9th Ed., 1977, pp. 684-685, pp. 170.
Weiserger, *Technique of Organic Chemistry*, vol. IV; Distillation, 1951, p. 377, Gp 170.

*Primary Examiner*—Arthur L. Corbin
*Attorney, Agent, or Firm*—Birch, Stewart, Kolash & Birch

[57] ABSTRACT

Fried foods are produced by adding an antioxidant to a frying oil and then frying a desired food stuff therein at 100°–250° C. The antioxidant is obtained by subjecting a starting material, selected from the group consisting of herb family spices, residues obtained after the recovery of essential oils from herb family spices, oleoresins obtained from the extraction of herb family spices with a polar solvent, and oleoresins and extracted residues obtained from the extraction of herb family spices with a non-polar solvent, to an extraction treatment with a polar solvent to obtain an extract, decoloring the extract with an adsorbent, concentrating the extract after separation of the adsorbent, forming an aqueous dispersion from the concentrate, steam distilling the aqueous dispersion to produce a steam distilled residue and recovering an insoluble part from the steam distilled residue. At least one additive selected from the group consisting of a mixture of dihydroxyacetone and amino acid, quercetin, citric acid, miso peptide, casein peptied, and phytic acid is added to the frying oil and/or the food stuff.

2 Claims, No Drawings

METHOD OF FRYING FOODS IN THE PRESENCE OF A SPICE ANTIOXIDANT

BACKGROUND OF THE INVENTION

1. Field of the Invention

The present invention relates to a method of producing fried foods such as fried noodles, fried potato chips, fried corn chips, fried nuts, fried crackers and the like, and more particularly to a method of producing fried foods which are resistant to oil oxidation and have an improved shelf life.

2. Description of the Prior Art

In the production of fried foods such as fried noodles, potato chips, fried crackers and the like, a frying oil containing a synthetic antioxidant such as BHA (butylhydroxy anisole) has hitherto been used in order to prevent oxidation of oil in the fried foods to improve the shelf life thereof. However, the use of such synthetic antioxidants as BHA is strictly restricted with respect to addition amount, kind of foods to be fried with and the like according to food regulations.

For this reason, it has also been proposed to add tocopherol (vitamin E), vitamin C, a mixture of tocopherol and melanoidin, citric acid or the like as an antioxidant to frying oil. However, the addition effect of such antioxidants is fairly poor as compared with that of BHA.

Consequently, there is a need for natural antioxidants giving a higher antioxidation effect to suppress oil oxidation with time in fried foods to an extent equal to or higher than BHA.

SUMMARY OF THE INVENTION

It is, therefore, an object of the present invention to provide a method of producing fried foods which have a low degree of oxidation of oil with time and hence an increased shelf life and retain the qualities such as flavor and color unchanged over a long period of time.

According to the present invention, there is provided a method of producing fried foods comprising adding an antioxidant to a frying oil and frying a desired food stuff therein at 100°–250° C. The antioxidant is obtained by subjecting a starting material, selected from the group consisting of herb family spices, residues obtained after the recovery of essential oils from herb family spices, oleoresins obtained from the extraction of herb family spices with a polar solvent, and oleoresins and extracted residues obtained from the extraction of herb family spices with a non-polar solvent, to an extraction treatment with a polar solvent to obtain an extractive, decoloring the extractive with an adsorbent, concentrating the extractive after the separation of said adsorbent, steam distilling the concentrate, and then recovering an insoluble part from the steam distilled residue.

The antioxidants used in the present invention provide an antioxidation action equal to or higher than that of butylhydroxyl anisole and have excellent antibacterial and antifungal properties. Although these antioxidants are obtained from herb family spices, they are substantially free of flavor inherent to the spices and are pale brown to white. When a fried food is produced by using a frying oil containing such an antioxidant, the degree of oxidation of oil in the fried food is substantially small even after a long-term storage and the quality of the fried food can be well retained over a long period of time. Such results are obtainable at minor amounts of the antioxidant added.

In a preferred embodiment of the present invention, at least one synergistic additive selected from the group consisting of a mixture of dihydroxyacetone and amino acid, quercetin, citric acid, "miso" peptide, casein peptide, and phytic acid may be added to the frying oil and/or the food stuffs to be fried together with the addition of the antioxidant to the frying oil. The addition of such a synergist gives a fried food a longer shelf life. It should be noted that "miso" is fermented soybean paste.

DETAILED DESCRIPTION OF THE INVENTION

The starting materials used for the production of the antioxidant in the practice of the present invention are herb family spices including sage, rosemary, marjoram, thyme, oregano, basil and the like. Various types of the starting materials may be used in the production of the antioxidant, including powders of the spices; residues obtained after the recovery of essential oils from the spices by steam distillation or the like; oleoresins obtained from the extraction of the spices with a polar solvent such as ethyl ether, ethylene chloride, dioxane, acetone, ethanol, hydrous ethanol, methanol, ethyl acetate, propylene glycol, glycerin or the like; and oleoresins and extracted residues obtained from the extraction of the spices with a non-polar solvent such as n-hexane, petroleum ether, ligroin, cyclohexane, carbon tetrachloride, chloroform, dichloromethane, 1,2-dichloroethane, toluene, benzene or the like.

In order to produce the antioxidant from the starting material, at least an equal volume of a polar solvent such as ethyl ether, ethylene chloride, dioxane, acetone, ethanol, an ethanol-water mixture having an ethanol content of not less than 65%, methanol, ethyl acetate, propylene glycol, glycerine, etc. or mixtures thereof is added to the starting material and then extraction is effected, preferably under reflux. This mixture is separated into an extractive and a residue in a conventional manner as by filtration, centrifugal separation or decantation, preferably under warming, and then the extracted residue is again subjected to the above procedure to thereby obtain an extractive, which is added to the precedent extractive.

To the extract is added an adsorbent such as activated carbon, diatomaceous earth, acid clay or the like to remove coloring matters such as chlorophyll from the extractive for decoloring. In this case, the adsorbent is added to the extractive in an amount of 1–20% by weight based on the weight of the starting spice. After refluxing for 10–60 minutes, the adsorbent is filtered off to obtain a decolored solution. This adsorption procedure is usually carried out once or twice.

The thus obtained solution (exhibiting light to dark brown due to the removal of green coloring matters or the like) is concentrated by heating at a temperature near the boiling point of the solvent used in the above extraction under a reduced or an atmospheric pressure to distill off the solvent. A dark brown or black glutinous or lumpy substance is obtained. Next, this substance is poured into water, preferably a 10 times by weight or more amount of water with stirring and the aqueous dispersion is heated under a reduced or an atmospheric pressure to perform steam distillation. During this treatment essential oil components exhibiting flavor inherent to the raw spice are distilled together with steam from the aqueous dispersion. The vaporization of the essential oil components may be accelerated by blowing steam into the aqueous dispersion in this steam distillation step.

After the steam distillation is continued until the essential oil components disappear in the steam distillate, the aqueous dispersion or steam distilled residue is separated into a dark brown water portion and a yellowish brown solid matter (insoluble part) in a conventional manner as by filtration, centrifugal separation or decantation before or after cooling. The separated solid matter is dried to yield a pale brown powdery fraction.

According to the present invention, the thus obtained solid matter or powdery fraction is used as the antioxidant. This solid matter or powdery fraction is substantially free of flavor inherent to the spice and has a very strong antioxidation effect and an excellent antibacterial action. It should be noted that the dark brown water portion resulting from the steam distilled residue tastes strongly bitter and produces a highly hygroscopic, dark brown lumpy or powdery substance when evaporated to dryness, which develops neither antioxidation nor antibacterial action.

The antioxidant produced by the above mentioned procedure is added to a frying oil. The frying oil is dependent upon the type of foods to be fried and is not necessarily limited. Examples of the frying oil which can be used in the practice of the present invention include fish oil, lard, tallow, soybean oil, cottonseed oil, safflower oil, rice bran oil, corn oil, sesame oil, peanut oil, coconut oil, palm oil and mixtures thereof. Furthermore, the antioxidant is added to the frying oil in amounts of 0.001-0.2% by weight, preferably 0.005-0.1% by weight based on the frying oil. The addition effect of the antioxidant is satisfactorily developed at small amounts. The antioxidant may be directly added to the frying oil, but more preferably, the antioxidant may be included in a fatty oil at a high concentration. The resulting concentrate is conveniently added to the frying oil.

In a preferred embodiment of the present invention, at least one synergist selected from the group consisting of a mixture of dihydroxyacetone and amino acid, quercetin, citric acid, "miso" peptide, casein peptide, and phytic acid is further added to the frying oil and/or the food stuffs to be fried. The use of such a synergist in combination with the antioxidant increases the shelf life and minimize oxidation of oil of an aging fried food. The amino acids which may be used herein include glycine, alanine, valine, leucine, isoleucine, cysteine, aspartic acid, glutamic acid, phenylalanine, histidine, tryptophane, proline, and mixtures thereof. Moreover, the synergist may preferably be added in amounts of 1-100 parts by weight per 1-10 parts by weight of the antioxidant in the fried food.

The frying oil containing the antioxidant and optionally the synergist is heated at a predetermined temperature dependent on the kind of foods to be fried, usually at a temperature of 100°-280° C. before any desired food is fried therein in the conventional manner.

As the foods fried according to the present invention, mention may be made of fried noodles, fried potato chips, fried corn chips, fried crackers, fried ricecake cubes, fried nuts such as buttered peanuts, fried sweetmeats, doughnuts, fried dough cookies and the like.

The fried foods produced by the method of the present invention show minimum oil oxidation even after a long-term storage, have a long shelf life, and well retain the qualities such as flavor, color and the like over a long period of time because they are fried with the frying oil containing the above-said antioxidant. Since the antioxidant is substantially free of its own flavor, appears approximately white, and further develops a satisfactory addition effect at a very small amount, it does not adversely affect the flavor, color and other qualities of the fried food. Moreover, as the antioxidant is extracted from the natural spice and is effective at a very small amount, the safety margin is high enough. In addition, the shelf life of fried foods can be further improved by using the antioxidant together with the aforementioned synergist.

The production of the antioxidant and the antioxidation effect thereof will be described below.

To 100.0 g of each of sample spice powders (sage, rosemary, marjoram and thyme), designated fraction A, was added 300 ml of 95% ethanol. The resulting mixture was subjected to extraction under reflux for one hour and thereafter separated by filtration into an extractive and an extracted residue. The extracted residue was further added with 300 ml of 95% ethanol, again subjected to extraction under reflux for one hour and separated by filtration into an extractive and an extracted residue designated fraction B. To the combined extractives was added 5 g of activated carbon. After refluxed for one-half hour, the mixture was filtered to obtain a supernatant. Again, 5 g of activated carbon was added to the supernatant and the above procedure was repeated. After filtering off of the activated carbon, the resulting brown solution (ethanol extractive) free of green coloring matters was heated to about 70° C. under a reduced pressure to distill off the ethanol, obtaining a brown glutinous or lumpy substance. Then this substance was suspended in an about 10 times by weight amount of water. With stirring, the suspension was heated to the boiling point for steam distillation to remove the remaining essential oils. After cooling, the steam distilled residue was filtered to remove a brown water layer designated fraction C (the dried substance of the brown water layer) and a light brown insoluble part was thus recovered. This insoluble part was dried to obtain a powdery antioxidant designated fraction D.

The yields of fractions A–D are shown in Table 1.

TABLE 1

| Fraction | Sample | | | |
| --- | --- | --- | --- | --- |
| | Sage | Rosemary | Thyme | Marjoram |
| A Starting material) | 100.0g | 100.0g | 100.0g | 100.0g |
| B | 68.1 | 67.6 | 72.7 | 69.0 |
| C | 10.2 | 6.8 | 15.3 | 15.8 |
| D (Antioxidant of the invention) | 5.9 | 11.2 | 2.8 | 2.1 |

Then, the antioxidant action of each fraction A–D was determined by the AOM method using lard.

A 20 g portion of purified lard containing 0.1 wt % of each fraction A–D was weighed into a test tube, which was placed in a constant temperature oil bath at 97.5°±0.5° C. Air was forcedly bubbled in the lard at a rate of 0.23 ml/hr. The heated lard was sampled out at suitable intervals and the peroxide value (POV) was measured according to the improved Lea method. The results are shown in Table 2.

For the sake of comparison, the same experiment was carried out using lard containing 0.02 wt.% of butyl hydroxy anisole (BHA).

TABLE 2

| Sample (0.1% in lard) | | Measurement of POV (meq/kg) Time | | | | |
|---|---|---|---|---|---|---|
| | | 17 | 45 | 71 | 97 | 117 |
| Sage | A | 2.7 | 5.8 | 12.2 | 259.0 | — |
| | B | 5.3 | 36.3 | 655.2 | — | — |
| | C | 3.3 | 10.5 | 76.8 | — | — |
| | D | 2.8 | 6.8 | 11.9 | 14.2 | 22.9 |
| Rosemary | A | 2.6 | 3.9 | 9.3 | 23.6 | 436.3 |
| | B | 4.0 | 32.8 | 682.4 | — | — |
| | C | 4.4 | 11.8 | 40.8 | 741.3 | — |
| | D | 3.3 | 6.0 | 10.6 | 14.8 | 18.2 |
| Thyme | A | 4.9 | 25.0 | 647.4 | — | — |
| | B | 5.5 | 51.2 | 684.4 | — | — |
| | C | 3.1 | 10.8 | 50.9 | 722.0 | — |
| | D | 2.6 | 7.0 | 11.1 | 13.4 | 39.3 |
| Marjoram | A | 5.6 | 31.9 | 859.5 | — | — |
| | B | 5.6 | 54.9 | 513.4 | — | — |
| | C | 5.0 | 16.1 | 385.0 | — | — |
| | D | 4.5 | 15.1 | 87.1 | — | — |
| BHA 0.02% | | 5.0 | 20.3 | 75.2 | — | — |
| Control (lard alone) | | 13.0 | 33.0 | 653.8 | — | — |

From the results of Table 2, it can be seen that the antioxidants of the invention (fraction D) give an excellent antioxidation effect.

The present invention will be described in detail with reference to the following examples and comparative examples. However, it is to be understood that the invention is not limited to the Examples. All percentages are by weight.

EXAMPLES, COMPARATIVE EXAMPLES

To an oil mixture having a composition of 50 parts by weight of lard and 50 parts by weight of palm oil were added given amounts of the antioxidant from sage, that is powdery fraction D of sage as mentioned above (hereinafter abbreviated as SA) as shown in Table 3. The resulting mixture was heated at a temperature of 150°±5° C., in which shaped raw noodle blocks optionally containing a synergist as shown in Table 3 were fried for 75 seconds.

Each of the fried noodle blocks was sealed in a polypropylene bag and stored at 50° C. over a given time. Thereafter, 10 g of the fried noodle was weighed out and treated with 100 ml of ethyl ether to extract the oil from the fried noodle. The peroxide value (POV) of the extracted oil was measured according to the improvement Lea method. The results are shown in Table 3.

For the sake of comparison, the same experiment as described above was repeated using the oil mixture alone or the oil mixture containing tocopherol or BHA instead of SA.

TABLE 3

| Antioxidant and amount (added in flying oil) | Synergist and amount (added in raw noodle blocks) | Measurements of POV* (meq/kg) | | | | | | | | | | | | | | | |
|---|---|---|---|---|---|---|---|---|---|---|---|---|---|---|---|---|---|
| | | Initial | 10 | 20 | 30 | 40 | 50 | 60 | 70 | 80 | 90 | 100 | 110 | 120 | 130 | 140 | 150 |
| Example | | | | | | | | | | | | | | | | | | |
| SA 0.02% | — | 2.6 | 3.1 | 4.2 | 4.8 | 7.7 | 6.7 | 7.3 | 8.5 | 9.5 | 18.8 | 20.9 | | 25.9 | 37.9 | 50.0 | 170.2 |
| SA 0.04% | — | 2.5 | 3.0 | 4.1 | | 7.6 | 7.7 | 8.1 | 8.6 | 10.8 | 15.0 | 16.3 | 19.8 | 32.3 | 35.5 | 42.3 | 50.9 |
| SA 0.02% | Dihydroxyacetone 0.05% + Amino acid mixture** 0.01% | 3.6 | 4.4 | | | | 7.8 | 7.7 | 7.6 | 10.8 | 13.3 | 17.2 | 20.1 | 21.6 | 25.5 | 25.4 | 38.2 |
| SA 0.02% | Quercetin 0.03% | 3.8 | 5.5 | | | | 11.9 | 8.1 | 7.4 | 8.9 | 12.3 | 12.4 | 13.0 | 17.3 | 27.9 | 23.4 | 30.5 |
| SA 0.02% | Citric acid 0.1% | 3.1 | 6.2 | | | | 6.7 | 5.2 | 6.1 | 6.9 | 8.8 | 11.1 | 16.8 | 27.6 | 16.4 | 25.6 | 32.1 |
| SA 0.02% | Phytic acid 0.1% | 3.2 | 4.3 | | | | 4.9 | 8.2 | 6.8 | 8.0 | 7.4 | 10.8 | 11.4 | 15.1 | 16.6 | 20.8 | 28.8 |
| SA 0.02% | "Miso" peptide 0.5% | 3.0 | 3.3 | | | | 6.6 | 7.0 | 8.4 | 8.3 | 9.2 | 10.8 | 12.2 | 16.0 | 27.7 | 26.3 | 37.1 |
| SA 0.02% | Casein peptide 0.5% | 2.9 | 3.3 | | | | 7.9 | 8.6 | 9.9 | 11.8 | 14.3 | 18.8 | 20.2 | 23.5 | 23.8 | 29.7 | 35.6 |
| Comparative Example | | | | | | | | | | | | | | | | | | |
| Tocopherol 0.03% | — | 3.8 | 5.6 | 4.2 | 15.5 | 19.1 | 20.9 | 31.4 | 29.2 | 36.1 | 49.3 | 57.8 | 60.2 | 76.9 | 234.9 | | |
| BHA 0.02% | — | 3.5 | 4.4 | | | | 20.5 | 25.3 | 30.3 | 34.4 | 40.9 | 59.7 | 108.8 | | | | |
| — | — | 3.4 | 3.6 | 6.2 | 8.7 | 11.5 | 13.2 | 19.2 | 19.3 | 29.8 | 107.2 | 698.3 | | | | | |

Notes:
*POV is an average value of measurements of two samples.
**Amino acid mixture is a mixture of glutamic acid 7 parts, proline 3 parts, leucine 2 parts, valine 1 part, arginine 1 part, phenylalanine 1 part and isoleucine 1 part by weight.

From the results of Table 3, it can be seen that the fried noodle produced by the method of the present invention shows reduced oxidation of oil with time and hence, has an excellent aging stability. Moreover, when noodles are fried according to the present invention, no significant difference in flavor and color is detected between the fresh fried noodle and the fried noodle aged for 90 days.

What is claimed is:

1. A method for producing fried foods, comprising the steps of:
    adding an antioxidant to a frying oil;
    adding an additive to said frying oil and/or to a foodstuff, said additive being present in an amount of 1–100 parts by weight per 1–10 parts by weight of said antioxidant in the frying oil, said additive being selected from the group consisting of a mixture of dihydroxyacetone and amino acid, quercetin, miso peptide, casein peptide, and phytic acid; and
    frying the foodstuff in said frying oil at 100°–250° C.;
    said antioxidant being added to said frying oil in an amount of 0.001–0.2% by weight and being obtained by (a) subjecting a starting material, selected from the group consisting of a herb family spice selected from sage and rosemary, residue obtained after the recovery of essential oils from said herb family spice, oleoresins obtained from the extraction of said herb family spice with a polar solvent, and oleoresins and extracted residues obtained from the extraction of said herb family spice with a non-polar solvent, to an extraction treatment with a polar solvent to obtain an extractive, (b) decoloring the extractive with an adsorbent, (c) concentrating the extractive after separation of said adsorbent, (d) pouring the concentrate into ten times by weight or more of water to obtain an aqueous dispersion, (e) steam distilling the aqueous dispersion to produce a steam distilled residue, and then (f) recovering an insoluble part from the steam distilled residue.

2. The method as claimed in claim 1, wherein said additive is a mixture of dihydroxyacetone and amino acid and said amino acid is selected from the group consisting of glycine, alanine, valine, leucine, isoleucine, cysteine, aspartic acid, glutamic acid, phenylalanine, histidine, tryptophane, and proline.

* * * * *